United States Patent [19]

Shatas et al.

[11] 3,748,475
[45] July 24, 1973

[54] NEUTRON GENERATOR AXIALLY ASSISTED BY LASER

[76] Inventors: Romas A. Shatas, 8003 Navios Dr. SE; Harry C. Meyer, III, 10002 Conrad Dr. SE; John D. Stettler, 410 Cumberland Dr. SE; Thomas G. Roberts, 2712 Mastin Lake Rd. NW, all of Huntsville, Ala.

[22] Filed: Feb. 17, 1972

[21] Appl. No.: 227,171

[52] U.S. Cl............ 250/502, 250/41.9 SE, 250/84, 250/499, 315/111
[51] Int. Cl.............................................. G21g 3/00
[58] Field of Search............... 250/84.5, 84, 41.9 SE, 250/41.9 SB

[56] References Cited
UNITED STATES PATENTS

| 3,360,733 | 12/1967 | Vali et al. | 250/41.9 SE |
| 3,294,970 | 12/1966 | Jerckel | 250/41.9 SE |
| 3,644,731 | 2/1972 | Eloy | 250/41.9 SE |
| 3,652,393 | 3/1972 | Kaiser et al. | 250/84.5 |
| 3,052,614 | 9/1962 | Herold | 250/84.5 |
| 3,338,789 | 8/1967 | Fink | 250/84.5 |

Primary Examiner—James W. Lawrence
Assistant Examiner—Harold A. Dixon
Attorney—Harry M. Saragovitz et al.

[57] ABSTRACT

A high density pulsed plasma generator produces a high temperature plasma which is sensed by a photo switch which in turn triggers the operation of a high energy pulse laser. The frequency of the laser light is such that the plasma will absorb it.

The laser is disposed in coaxial alignment with the center electrode of the plasma gun so that the high energy laser radiation illuminates the plasma blob axially to its motion with respect to the center electrode of the coaxial plasma gun.

3 Claims, 2 Drawing Figures

NEUTRON GENERATOR AXIALLY ASSISTED BY LASER

BACKGROUND OF THE INVENTION

This invention is related to the field of neutron generators. More specifically this invention is related to a neutron generator which is assisted by a pulse laser device. In the prior art devices pulses of neutrons could only be obtained from plasma generators like those developed in research on controlled thermonuclear devices, from pulsed fission reactors, and from laser created plasma where a high energy pulse of a laser is used to heat a target. The fission reactors are very expensive and produce radioactive waste.

SUMMARY OF THE INVENTION

This invention consists of a high energy pulsed $CO_2$ laser ($10^3$ joules or more at 10.6 $\mu$m) and a high density pulsed plasma generator ($2 \times 10^{19}$cm$^{-3}$ or more at a temperature of $10^{7\circ}$ Kelvin or more) arranged and operated so that the laser beam is focused on the volume where the high density plasma is produced coaxially with the center of axis of the inner electrode of the dense focus gun.

The timing of the events is accomplished by use of a photo switch to determine when the plasma is to be in the desired volume and then firing the laser circuit so that the laser beam will reach the plasma when desired. In this manner the jitter of all the switches on the plasma generator is by-passed so that the time when the plasma volume is filled is known within approximately a nanosecond, and the only jitter which has to be minimized is in the time required to fire the laser device.

DESCRIPTION OF THE PREFERRED EMBODIMENTS

The laser assisted neutron generator is a device that utilizes the interaction of a laser beam of the proper frequency with a hot deuterium tritium plasma to create the necessary conditions for the increase in production of neutrons in fusion reactions. Although the plasma generator already produces neutrons, the cross section of the fusion reactions increases very rapidly with increasing temperature if the temperature is raised above that obtainable by the plasma generator. Therefore, a high energy laser pulse is used to increase the temperature of the plasma, and even relatively small increases in the temperature of the plasma by absorption of the laser energy yields a significant increase in the rate of neutron production. The frequency or wavelength of the laser light has to be such that the plasma will absorb it, and the combination and interaction of a particular high energy pulsed laser at 10.6 microns and a particular type of plasma generator where conditions are proper for the absorption of this energy.

A simple correction to the plasma absorbance expression based on the inverse Bremstrahlung (including the stimulated emission) yields a penetration depth of the order of $$d \approx 10^{22} T_e^{3/2} \sqrt{\frac{1 - \left(\frac{\omega P}{\omega}\right)}{GN_e^2 \lambda^2}} \text{ [cm.]}$$

where $T_e$ is the electron temperature in °K; G is the Gaunt factor — of order of 10 at the temperature of these plasmas, $N_e$ is the number of electrons per cubic centimeter, $\lambda$ is the laser wavelength, and $\omega$ and $\omega_p$ are the laser frequency and plasma frequency, respectively. At $\omega = \omega_p$, this expression shows a zero which could be evaluated by considering the analogy of the skin effect in metals, the anomalous resistivity of plasmas in high electro-magnetic fields, or the non-linear effects of laser propagation in dense plasmas and indications are that for a plasma whose electron density is $2 \times 10^{19}$ cm$^{-3}$ and whose temperature is $10^{7\circ}$ K a 75 percent absorption of the incident beam occurs within a distance $d \approx 2\lambda$ when $\omega \approx \omega_p$. Therefore, plasma volumes of the order of $(2\lambda)^3 \approx 10^{-8}$ cm$^3$ for $CO_2$ laser radiation should be sufficient to absorb most of the incident laser beam when $\omega \approx \omega_p$. The absorption of this energy will increase the temperature of the plasma and thereby increase the number of neutrons produced by the plasma. When the plasma temperature is increased the neutron production goes up by the ratio of $\overline{v\sigma}$ at the final temperature to $\overline{v\sigma}$ at the initial temperature. Here $\overline{v\sigma}$ is the product of the relative velocity $v$ and the reaction cross section $\sigma$ averaged over the velocity distribution of the ions. For the conditions considered here doubling the temperature can cause more than one order of magnitude increase in the neutron yield.

Figure 1:
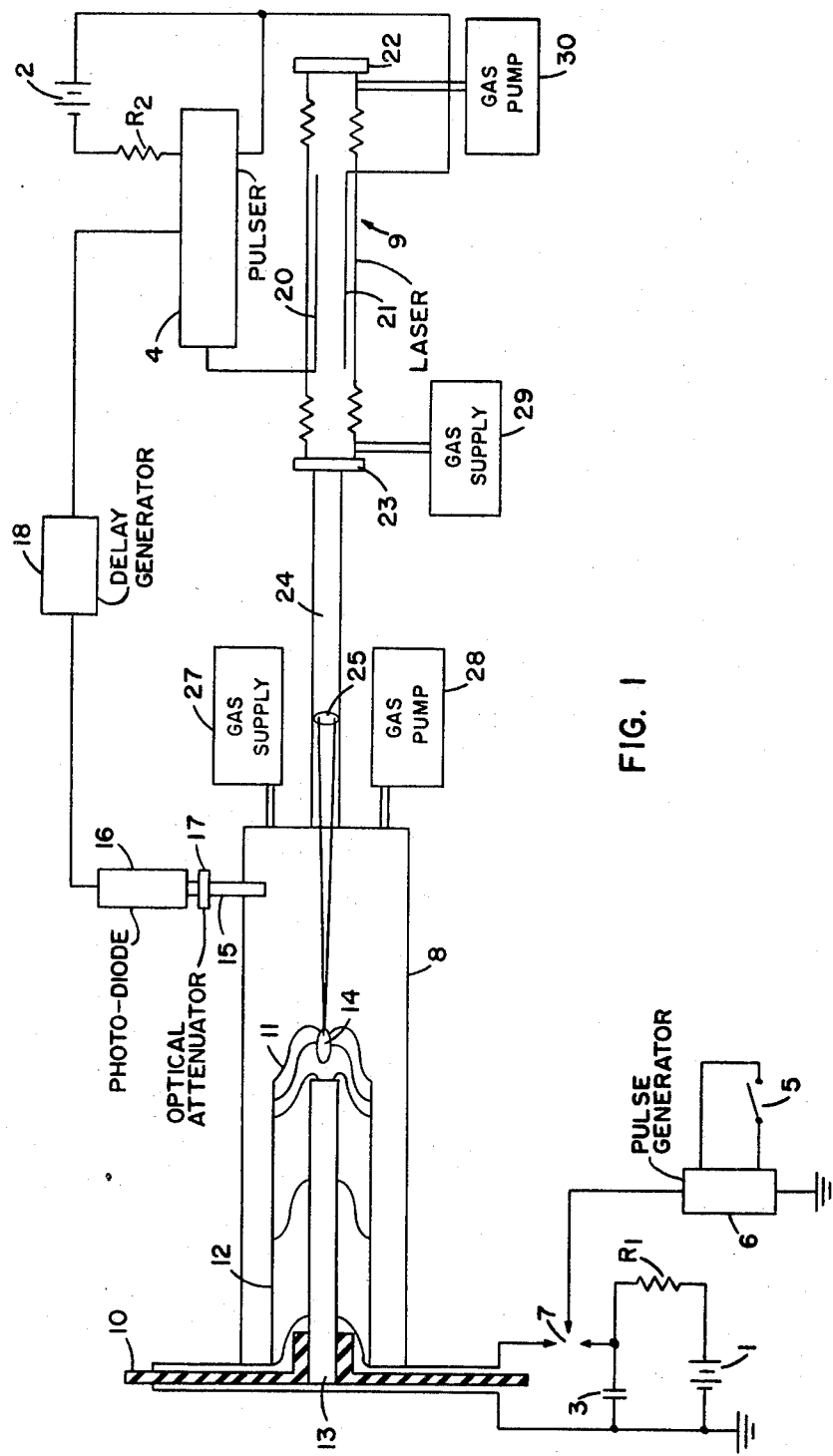
FIG. 1 is a diagrammatic view illustrating the coaxial arrangement of the laser and plasma gun and the electrical system of the present invention.

As shown in FIG. 1, the apparatus of the present invention includes a plasma gun 8 and a laser 9 disposed in axial alignment. A power supply 1 is provided for the plasma gun 8 and the electrical system therefor includes a charging resistor $R_1$, condenser bank 3, starting switch 5 and pulse generator 6 and switch 7. The electrical system for the laser includes a power supply 2, charging resistor $R_2$ and an electrical laser pulser 4.

Plasma gun 8 includes an insulator 10, an outer electrode 12 and an inner electrode 13. The plasma gun is operationally connected to the laser through a light pipe 15, optical attenuator 17, photo-diode 16, and a signal delay generator 18 which is connected to the electrical laser pulser 4.

Referring to the figures, before the sequence of events is started both the coaxial plasma gun 8 and the high energy $CO_2$ laser 9 are filled to the desired pressures with the gases to be used; and the power supplies 1 and 2 have charged through their respective charging resistors $R_1$ and $R_2$, the condenser bank 3 and the laser pulser 4 to the working voltages. The sequence of events is now started by closing starting switch 5. This causes the pulse generator 6 to close the switch 7 and the voltage of the condenser bank 3 appears across the electrodes of the coaxial dense plasma focus gun 8. The gas in the coaxial plasma gun breaks down near insulator 10 forming the current sheath 11. The current sheath then propagates between the outer electrode 12 and the center electrode 13. The current sheath is driven by the magnetic pressure of its own magnetic field, and the discharge becomes more intense as the sheath propagates. When the current sheath reaches the end of the electrodes it folds back on itself and rapidly collapses the plasma toward the axis of the tube as in a z-pinch. This produces the hot plasma volume 14 where electron or ion number density may be as high as $2 \times 10^{19}$ cm$^{-3}$, the temperature may be as high as several times $10^{7\circ}$ Kelvin and the confining magnetic fields are of the order of megagauss. At this time and for a period on the order of a microsecond, neutrons are produced. As the current sheath is moving down the coaxial gun and the light intensity of the discharge increases, it is being detected by light pipe 15 which carries it to photo diode 16 after having passed through the variable optical attenuator 17. Variable optical attenuator 17 is preset so that the light intensity will not cause a signal delay generator 18 to begin operating until the current sheath has reached a predetermined location in the coaxial plasma gun. In this manner the jitter of all events prior to the time the signal delay generator is started are avoided and have no effect on the problem of synchronizing the laser firing. The signal which starts signal delay generator 18 is delayed a preset amount and is then used to actuate the laser pulser 4 which has already been pre-charged up to the required electrical energy level by the power supply 2 so that the entire voltage of laser pulser 4 appears across the discharge electrodes 20 and 21 of the high energy pulsed $CO_2$ laser 9. The preferred embodiment of the laser is the high pressure electron beam preionized electrical discharge pumped arrangement in which the electric field intensity between the discharge sustaining electrodes 20 and 21 is chosen such as to maximize the transfer of electrical energy into molecular rotational and vibrational energy of the lasing gas. The electron beam in ionizing collisions with the lasing gas provides the positive and negative charge carriers which drift at relatively slow velocities under the sustainer field and in colliding with neutral atoms or molecules of the lasing gas transfer a part of their kinetic energy into rotational-vibration excitations. This creates a medium of very high gain between mirrors 22 and 23. Therefore, oscillations are set up between the mirrors and the energy in the inversion is extracted in a pulse of radiation at 10.6 $\mu$m. The shape of this pulse can be tailored somewhat if desired by rotating mirror 22 so that the laser is "Q"-switched. The laser beam 24 is focused onto plasma volume 14 by lens 25 which may be made of NaCl or any other material which transmits energy at 10.6 $\mu$m. By focusing the laser beam on the plasma volume at the proper time, the laser energy is absorbed by the plasma electrons which transfer part of their energy to the ions so that the plasma is further heated. This heating of the plasma increases the cross section for the fusion reaction and thereby substantially increases the neutron yield.

In order to operate the laser assisted neutron generator again, one must first change the gases in the coaxial plasma gun and the high energy $CO_2$ laser by way of gas supplies 27 and 29 and pumps 28 and 30 and recharge condenser bank 3 and laser pulser 4.

Figure 2:
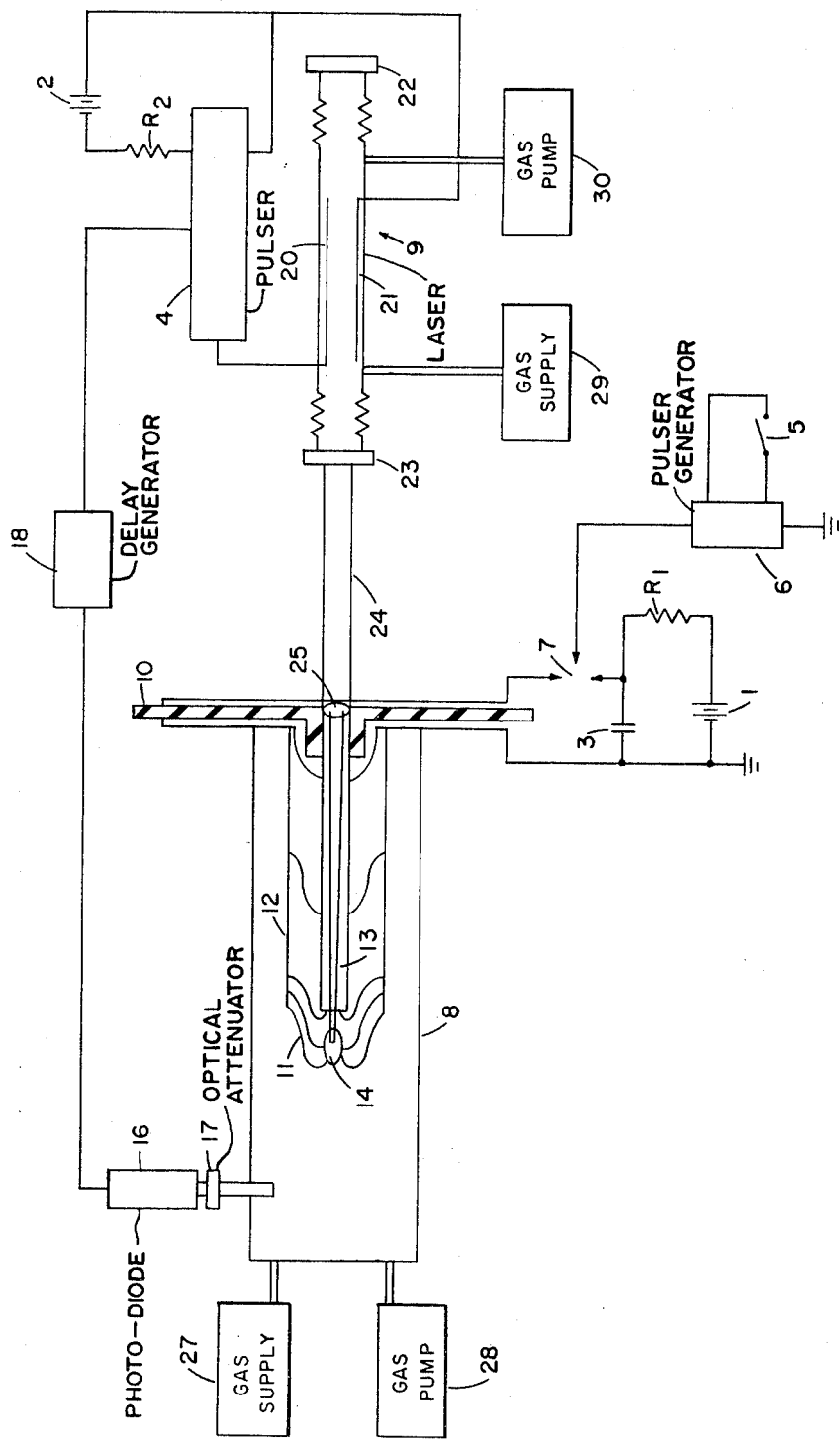
FIG. 2 is a diagrammatic view of an alternate embodiment of the device of FIG. 1.

In an alternate embodiment, as shown in FIG. 2, wherein like numerals designates like parts, the plasma gun 8 is arranged so the insulator 10 is facing the laser beam. Lens 25 is shown mounted in the path of the laser output within the insulator. The positioning of the lens is arbitrary within the center electrode it only being necessary that the laser radiation is focused onto plasma 14.

The $CO_2$ laser referred to herein may be of the type described by G. J. Dezenberg et al., IEEE J. Quantum Electron. QE-6, 652 (1970).

A typical plasma generator utilized in conjunction with the laser may be of the type developed by J. W. Mather at Los Alamos Scientific Laboratories, Los Alamos, New Mexico and disclosed in Phys. Fluids 8, 366 (1965).

It should be seen, therefore, that applicants have provided apparatus for accurately injecting a laser beam onto a plasma for generating neutrons. Since the plasma moves along the longitudinal axis of the plasma generator, a laser beam directed into the plasma generator normal to or at an angle to the longitudinal axis of the plasma generator could fail to completely inject into the moving plasma. Thus, by axially aligning the laser and the plasma generator, the laser beam is accurately injected into the plasma.

We claim:

1. A laser assisted neutron generator comprising a pulsed plasma generator for generating a plasma; pulsed laser means for producing a laser beam which is compatible with the plasma so that the plasma will absorb energy therefrom, said plasma generator and said laser means being disposed in axial alignment so that the laser radiation illuminates the plasma axially to its motion with respect to the center line of said plasma generator; transferring means for directing said laser beam to said plasma so as to heat said plasma; triggering means connected to said laser so as to trigger the laser; a light sensing means positioned so as to detect the light energy in the plasma generator and to generate a signal upon the light energy reaching a predetermined value; said signal being connected to said triggering means so as to set said triggering means into operation whereby said laser will produce its laser beam at the same time the plasma is generated.

2. Apparatus as in claim 1 with said plasma gun having a center electrode and an outer electrode, said laser being aligned in coaxial relationship with said center electrode.

3. Apparatus as set forth in claim 2 wherein said transferring means is a lens positioned coaxially with said center electrode so as to focus the laser radiation onto said plasma.

* * * * *